Nov. 13, 1934.　　　S. B. APPLEBAUM　　　1,980,161
IMPROVED WATER SOFTENING APPARATUS
Filed April 1, 1931
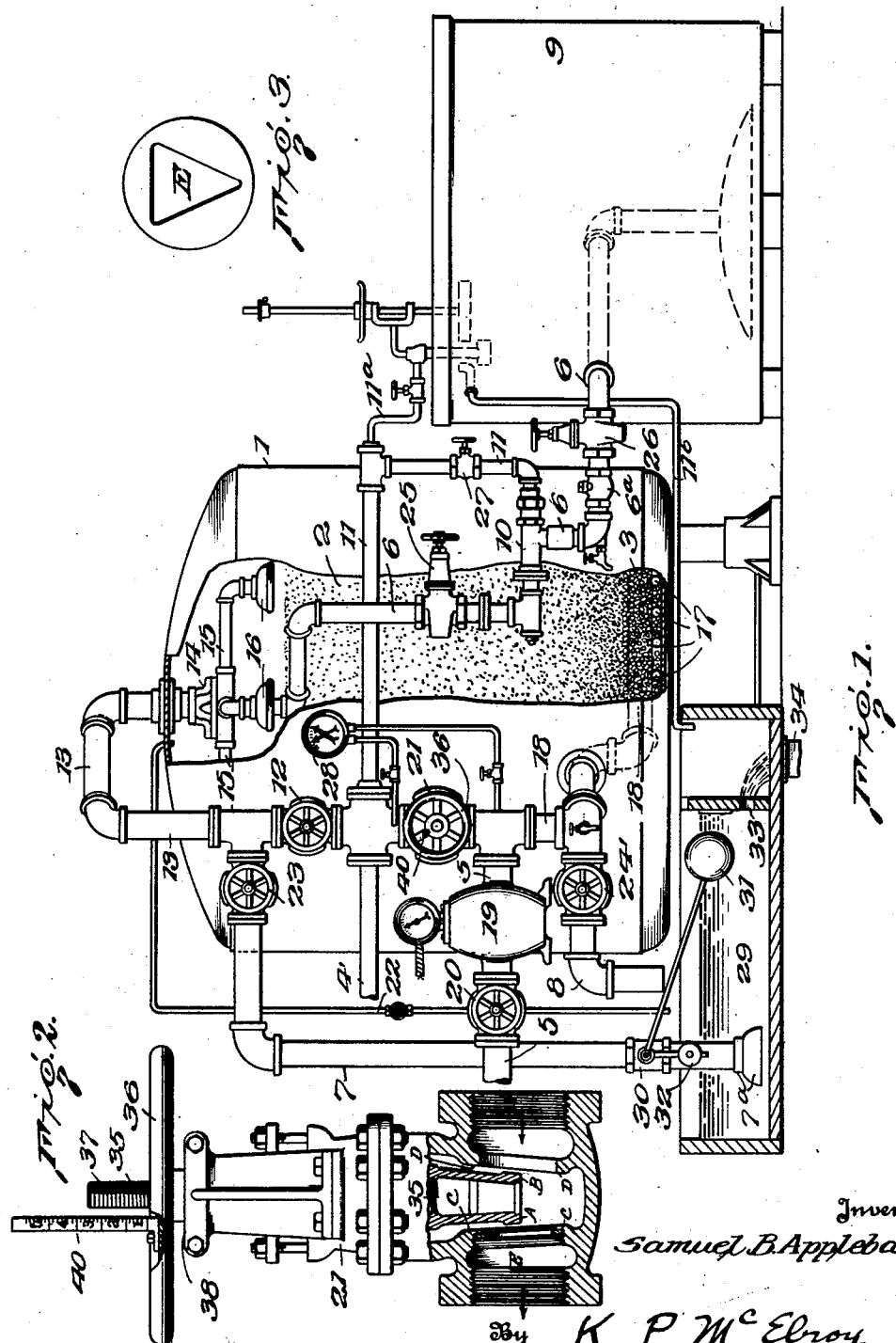
Inventor
Samuel B. Applebaum,
By K. P. McElroy
Attorney Patented Nov. 13, 1934

1,980,161

UNITED STATES PATENT OFFICE 1,980,161

IMPROVED WATER SOFTENING APPARATUS

Samuel B. Applebaum, New Rochelle, N. Y., assignor to The Permutit Company, New York, N. Y., a corporation of Delaware Application April 1, 1931, Serial No. 526,935

9 Claims. (Cl. 210—24)

This invention relates to improved water softening apparatus; and it comprises a water softener adapted for softening by passage of hard water through a pervious granular bed of base exchange silicates and having an inlet for hard water, an outlet for soft water, an inlet and an outlet for salt solutions and connections for backwashing and for removal of backwashing water, said softener being provided with means in the backwash water inlet for giving methodical acceleration and deceleration of the volume rate of flow of water in backwashing, and for preventing sudden rushes and stoppages thereof, said means being usually a valve with a V-shaped opening and a threaded stem having a fine pitched thread; and it further comprises certain improvements in the operation of said softener, whereby backwash water is admitted as a flow steadily and progressively accelerated from zero to maximum and later steadily and progressively decelerated back to zero; all as more fully hereinafter set forth and as claimed.

In water softeners of the original type (Gans Patent 1,195,923) softening is effected by sending the hard water downward through a pervious bed of granular zeolites supported on a layer of gravel or something of the sort. In the ordinary routine, when hard water appears below the bed the operation is interrupted and the bed regenerated by a solution of common salt, the used salt solution being removed and the bed washed. From time to time the bed is lifted and agitated by a flow of water upwards, the effluent water being sent to the sewer. This operation which is called backwashing has two important functions. While the pervious bed is not a filter and is not used for filtering purposes, it nevertheless usually accumulates a slimy growth on the granules and more or less extraneous matter requiring removal. Removal of extraneous matter and cleaning of the granules are effected by the lifting and scouring actions in backwashing. Another important result of backwashing is a grading and sizing of the zeolite particles by which, when the flow of backwashing water is interrupted, the granules of the bed are classified, the coarser particles of zeolite settling down next the layer of gravel at the bottom and the finest granules being deposited at the top of the bed. This classification and stratification are extremely important.

Other things being equal, the water softening capacity of the bed depends upon the evenness with which the downflowing water can be distributed through the entire cross-section. With any tendency to channel, hard water will locally reach the bottom of the bed before the entire body of zeolite is exhausted. It is found in practice that the best distribution is effected by having the top of the bed composed of relatively fine stuff, thereby making the frictional resistance to the passage of water maximum at this point. The classification effected in backwashing gives this result but it is found that in subsequent use of the bed the fine stuff works down after a time. Repeated classification from time to time by backwashing in a regulated flow is necessary for the best results.

In practical operation, the backwashing step, if improperly carried on, may seriously decrease the effective action of the water softener. A sudden rush of water may disarrange or disrupt the underlying gravel layers and lead to local disturbances in the zeolite bed and derangement of the stratification. One of the objects accomplished in the present invention is to prevent deleterious effects in backwashing and to provide means insuring that backwashing in the softener shall always be carried on under the best possible conditions.

I have found that in backwashing equally good removal of impurities can be secured and a better classification and stratification of the bed attained by giving the inflowing backwashing water a methodical acceleration to maximum volume rate of flow and at the end of backwashing a methodical deceleration from this maximum to zero flow. This acceleration and deceleration of the volume rate of flow brings about a corresponding acceleration and deceleration in the linear rate of flow in the softener. With gradual acceleration the gravel underbed is not disturbed or rearranged in any troublesome way, while with gradual deceleration from maximum velocity, the classification and stratification of fine and coarse granules in the bed become nearly ideal.

In the apparatus of my Patent No. 1,443,892, whereon the present invention is in some of its aspects an improvement, I have provided automatic means for limiting the flow of backwash water through the zeolite bed below a predetermined maximum; thereby preventing loss of zeolite with the waste water and securing better results in lifting and scouring the granules and cleaning the bed. It has now been found that, in addition to limiting the maximum velocity of the backwash current, it is also of importance to regulate the rate of acceleration and deceleration of the backwash flow, that is, the rate of change of flow at the beginning and ending of the backwash period. And in the present invention I provide means for, and a manner of, backwash acceleration and deceleration which will automatically adjust these rates below a desired maximum and prevent this being exceeded even when the operation is conducted by inexperienced or careless operators, while also securing better results in rearranging or classifying the granules in the bed preparatory to using the apparatus in another softening phase.

In what I regard as the best embodiment of my invention, I provide a valve in the backwash water inlet having a V-shaped port opening and having a transversely extending closure operated by a fine threaded valve stem; movement of the closure being along the axis of the triangle from vertex to base and vice versa. With this type of port and closure, the desired result of a progressively increasing and progressively decreasing volume of flow can be readily secured. The fine threading of the stem gives a better time factor. The cross-sectional areas available for water flow at different points of closure bear a quadratic relation; that is, in opening a given distance, the area available for flow is one-quarter what it is at twice that distance. With a flow progressively increasing and diminishing in this way, the maximum flow being below that at which zeolite will be carried to the outlet, even and thorough lifting of the bed is secured in opening the valve and uniform redeposition of the granules in ordered arrangement is secured in closing.

In the accompanying drawing I have shown more or less diagrammatically an apparatus within my invention. In this showing, Fig. 1 is a side elevation of a water softening apparatus with a portion of the softening tank broken away to illustrate the interior thereof;

Fig. 2 is a view partly in side elevation and partly in longitudinal section of a backwash inlet valve; and Fig. 3 is a plan detail of the V-shaped port disc of the valve of Fig. 2.

Referring to Fig. 1, the structure 1 represents a softening tank containing a bed of granular zeolites 2 resting upon underlying layers of gravel 3. The hard water inlet pipe is shown at 4, the soft water outlet at 5, the brine supply line at 6, with its check valve 6a, and two waste connections at 7 and 8. The source of brine supply is shown as salt tank 9, from the bottom of which brine line 6 runs through an injector 10 which is actuated by a flow of water admitted through pipe 11 which is a branch of the hard water inlet line 4. Pipe 11a supplies water to the salt tank and pipe 11b serves as an overflow connection.

In the softening phase of operation valve 12 is opened to admit hard water into the top of the softener tank through conduit 13 terminating inside the tank in fitting 14, softened water leaving the bottom of the softening tank through distributor heads 17, branching into conduit 18 which leads through meter 19 to the soft water outlet line 5, valve 20 being open. The hard water supply line 4 and the soft water service line 5 are connected by a by-pass controlled by backwash valve 21, shown as having a relatively large stem and rotating handle or wheel 36. Valve 21 is closed during the softening operation. Valved air vent 22 runs from the extreme top of tank 1. The two waste lines 7 and 8 are connected respectively with the top and bottom conduits 13 and 18 and are controlled by valves 23 and 24 respectively, these valves being both closed during the softening stage.

In the regeneration phase of operation, valves 12 and 20 are closed, the brine line is opened by means of valves 25 and 26, water being applied to injector 10 by opening valve 27. The brine line being, as shown, connected into a brine distributor 15, supported by fitting 14, and having horizontal branches with distributor heads 16, brine is distributed over the top of the bed, percolates through the bed downwardly and goes to waste through distributors 17, conduit 18 and waste line 8, valve 24 being opened. To rinse the spent brine from the zeolite bed, valve 26 is closed and water admitted through valve 27 displaces the brine from the bed, the rinsing water running to waste through conduit 8.

In the backwashing phase of operation, necessity for which becomes evident by an increasing frictional resistance in the softening bed, as indicated by a differential pressure gage 28 connected to the hard water and the soft water lines, valves 12 and 20 are closed, the bottom waste valve 24 is also closed, the top waste valve 23 is opened and the backwash valve 21 is opened, the brining system valves 25, 26 and 27 being closed. Backwashing is effected by a current of water, passing into the softener through conduit 18, running upwardly through the gravel 3 and zeolites 2, and going to waste through fitting 14, conduit 13 and waste line 7. When backwash flow control is provided in the manner of my acknowledged patent, waste line 7 may deliver through a flared stilling fitting 7a into a sump or trough 29, the flow of backwash water being maintained constant below a desired maximum by means of float valve 30 actuated by float 31 and weight 32 in conjunction with regulated orifices 33; all as described in my Patent No. 1,443,892; drain connection 34 serving to carry off the waste water. Before fully opening the backwash valve 21 it is advantageous to vent air from tank 1 through air vent 22 and at the same time to fill sump 29.

In the present invention I provide in the softening apparatus a special backwash valve 21 as illustrated in detail in Figs. 2 and 3. Valve 21, as shown, is of the gate valve type having gates A and B provided with faces adapted to engage tightly with the surfaces C and D of a traveling transverse closure as the valve closes. To facilitate a gradual change in the port area of the valve in opening and closing the valve, I provide in the inlet or outlet port of the valve a V-port disc E which may be threaded into the valve port or otherwise attached thereto in proximity to the surface C (as shown), the point of the V being advantageously at the bottom of the valve port, the arrangement providing a V-shaped port orifice. At the same time I usually provide upon stem 35 an actuating wheel 36 of relatively large diameter with the connection between the stem and the wheel comprising threads 37 of very fine pitch so that a slow opening and closing of the valve is necessitated. The wheel has a smoothed surface bearing upon a machined surface 38 on the valve housing. In careful regulation of the backwash flow it may be, and often is, advantageous to have the valve provided with a graduated scale enabling the position of the valve stem to be accurately noted. As shown, scale 40 is attached to the wheel of the valve for this purpose.

In a typical embodiment of my invention applied to a water softening tank of 38 square feet cross-sectional area, I have found that a lineal rate of flow of backwash water of 0.8 feet per minute upwardly through the zeolite bed is adequate and not excessive. To gradually raise the backwash flow rate from zero to 0.8 feet per minute a 3 inch backwash valve 21 was provided with a V-port disc having an orifice shaped as an equilateral triangle with 2 inch sides and an area of 1¾ square inches and with a valve stem of ⅞ inch diameter, having 9 threads to the inch. The valve wheel was 7½ inches in diameter. It usually required one minute to open or close valve 21 and its construction served to discourage attempts on the part of operators to open it more quickly. The slow movement of the valve was found to materially improve the action of the softener as a whole, spreading acceleration and deceleration over a greater time. As a result of the accurate classification of the granules brought about by the gradual deceleration, the effective softening capacity between regenerations was increased. Concomitantly, less frequent regeneration was required in relation to a given amount of water softened and expenditure of salt was decreased.

A beneficial result of my invention is that the backwashing operation is regularized and is made fool-proof, with consequent improvement in the general action of the softener.

While usually better results are obtained in putting the backwash accelerator control valve on the backwash water inlet line, it is sometimes advantageous to put it on the backwash outlet line. For example, valve 23 may have the construction illustrated in Figs. 2 and 3.

While the present invention has been described more particularly in its application to a softener operating with downflow and while it has its principal utility in regulating the flow of water in backwashing, yet it can be used and with advantage in upflow softening. In upflow softening the zeolites are kept in a state of suspension by the flowing water, the bed being expanded and lifted. It is however in many cases advantageous to give the bed periodic washing by an upward flow of water at a rate greater than the normal softening rate of flow. In regulating the acceleration and deceleration of the water flow in such cases the present valve has advantages, since the expansion of the bed can thus be accurately controlled.

One of the beneficial effects of my invention is that it increases the water softening capacity of many installations by allowing more zeolite to be put into the softening chamber, thereby correspondingly reducing the free space above the bed without risk of flotation and carrying off of zeolite in the water flow. An increase in the amount of effective space in the chamber is highly desirable and is made possible by the automatic control here provided of the rates of acceleration and deceleration of the backwash flow.

What I claim is:—

1. A water softener adapted for softening by passage of hard water through a pervious bed of water softening material and having an inlet for hard water, an outlet for soft water, an inlet and an outlet for regenerating solutions and inlet and outlet connections for backwashing and for removal of backwashing water, one of said backwashing connections being provided with valve means adapted to effect an initial gradual and regular acceleration of the inflowing current of backwashing water and a subsequent gradual and regular deceleration of said current.

2. A water softener adapted for softening by passage of hard water through a pervious bed of base exchange silicates and having an inlet for hard water, an outlet for soft water, an inlet and an outlet for regenerating solutions and inlet and outlet connections for backwashing and for removal of backwashing water, one of said backwashing connections being provided with a valve for starting and stopping the backwash having a gate member and a V shaped port orifice adapted to cause, upon movement of the gate member across the orifice a regularized gradual acceleration of the flow through the valve.

3. The apparatus of claim 2 wherein the gate valve in the backwash water connections is in the backwash inlet line.

4. In a water softener adapted for softening by passage of hard water through a pervious bed of base exchange silicates and having an inlet for hard water, an outlet for soft water, an inlet and an outlet for salt solutions and connections for backwashing and for removing backwash water, valve means for starting and stopping the backwash having a member provided with a triangular port and a transverse closure member mounted on a threaded stem and adapted upon opening of the valve to move along the longitudinal axis of the port triangle from apex to base.

5. In a water softener adapted for softening by passage of hard water through a pervious bed of base exchange silicates and having an inlet for hard water, an outlet for soft water, an inlet and an outlet for salt solutions and connections for backwashing and for removing backwash water, a valve for starting and stopping the backwash having a member provided with a port having the form of an equilateral triangle and a transverse closure member mounted on a threaded stem and adapted in opening the valve to move along the longitudinal axis of the port triangle from apex to base.

6. In the operation of a water softener apparatus having a charge of granular base exchange silicates alternately used and regenerated and occasionally backwashed by a flow of water, the improvement in backwashing which comprises supplying said flow in gradually steadily and regularly increasing volume up to maximum flow and then gradually steadily and regularly decreasing said flow from the maximum down to zero.

7. In the method of claim 6, supplying the backwashing flow in a volume increasing in a quadratic relation with time up to a maximum flow.

8. In a regenerative base exchange water softener comprising a bed of water softening material in a chamber provided with the usual valved pipe connections to hard water, soft water, brine and waste lines and also with inlet and outlet connections for backwashing the bed and for removal of backwash water, valve means for starting and stopping the backwash adapted to retard and to graduate the acceleration and deceleration of the backwash flow, said valve means being provided with a triangular port opening and a closure member adapted to be moved longitudinally along the axis of the triangle from the apex to the base to open the valve.

9. In the operation of a regenerative base exchange water softening bed a method of increasing the water softening capacity of the bed and of decreasing the amount of regenerating agent required which comprises classifying and stratifying the bed by occasionally backwashing the bed with an upward flow of water through the bed, slowly, steadily and regularly accelerating said flow from zero up to a controlled maximum and then slowly, steadily and regularly decelerating the flow from the maximum down to zero.

SAMUEL B. APPLEBAUM.